Patented Dec. 2, 1941

2,264,758

UNITED STATES PATENT OFFICE 2,264,758

VULCANIZATION OF RUBBER

Paul C. Jones, Akron, Ohio, assignor to The B. F. Goodrich Company, New York, N. Y., a corporation of New York No Drawing. Application June 30, 1939, Serial No. 282,235

16 Claims. (Cl. 260—780)

This invention relates to the vulcanization of rubber, and to a new method of accelerating said vulcanization.

It has long been known that accelerators containing a dithiocarbamyl group are very active accelerators even at low temperatures. The activity of the alkyl dithiocarbamates is so great that they have often caused vulcanization even at room temperatures which has greatly limited their usefulness in factory operations.

It is an object of this invention, accordingly, to provide a method whereby the vulcanization of rubber compositions containing dithiocarbamyl accelerators is retarded at low temperatures, but proceeds rapidly at ordinary vulcanizing temperatures to produce tightly cured vulcanizates having better physical properties and greater resistance to ageing than vulcanizates prepared in the absence of any retarder.

The objects of this invention are accomplished by vulcanizing rubber containing a dithiocarbamyl accelerator in the presence of a thioamine having the formula R—S$_x$—R' wherein R and R' are members of the class consisting of secondary and tertiary amino groups and $x$ is one of the integers 1, 2, 3, and 4. Typical thioamines which may be employed in the compositions of this invention include

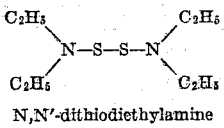

N,N'-dithiodiethylamine

N,N'-trithiodiethylamine, N,N'-monothiodiethylamine, N,N'-dithiocyclohexylamine, N,N'-dithiobenzylamine, N,N'-dithioaniline, N,N'-trithiomorpholine, and N,N'-tetrathiomorpholine. The preferred thioamines at present are the N,N'-thiodialkylamines. It will be understood that these compounds are illustrative of the types of thioamines which may be employed, and that other thioamines having the general structural formula R—S$_x$—R' may be employed if desired.

A wide variety of dithiocarbamyl accelerators may be used including the free diaryldithiocarbamic acids such as phenyl-beta-naphthyldithiocarbamic acid; the metallic salts such as the sodium or zinc salts of dimethyldithiocarbamic acid, diphenyldithiocarbamic acid, etc.; substituted ammonium dithiocarbamates such as benzyl hexamethylenetetrammonium diphenyldithiocarbamate, dimethyl ethyl phenyl ammonium phenyl-betanaphthyldithiocarbamate; polynitroaryl esters of dithiocarbamic acids such as 2,4-dinitrophenyl diphenyldithiocarbamate, 2,6-dinitro-4-chlorophenyl dimethyldithiocarbamate; amino esters such as tris (diphenylthiocarbamylmercaptomethyl) amines; thiuram sulfides such as tetraethyl thiuram monosulfide, tetramethyl thiuram disulfide, tetraphenyl thiuram disulfide, and other dithiocarbamyl derivatives of which a great number are well known to the art.

As a specific example of this invention, the following compositions were prepared, vulcanized in a heated press, and tested for physical properties. "T" in the following table represents tensile strength in lbs./in.$^2$, and "E" represents elongation in per cent.

| | Rubber compositions | | | | | |
|---|---|---|---|---|---|---|
| | 1 | 2 | 3 | 4 | 5 | 6 |
| Rubber | 100 | 100 | 100 | 100 | 100 | 100 |
| Zinc oxide | 5 | 5 | 5 | 5 | 5 | 5 |
| Sulfur | 3.5 | 3.5 | 3.5 | 3.5 | 3.5 | 3.5 |
| Stearic acid | 1 | 1 | 1 | 1 | 1 | 1 |
| N,N'-dithiodiethylamine | 0 | .5 | 1 | 0 | .5 | 1 |
| Tris (diphenylthiocarbamylmercaptomethyl) amine | .25 | .25 | .25 | 0 | 0 | 0 |
| Zinc salt of dimethyldithiocarbamic acid | 0 | 0 | 0 | .25 | .25 | .25 |

| Min. cure at 220° F. | Physical test data | | | | | | | | | | | |
|---|---|---|---|---|---|---|---|---|---|---|---|---|
| | 1 | | 2 | | 3 | | 4 | | 5 | | 6 | |
| | T | E | T | E | T | E | T | E | T | E | T | E |
| 15 | 1,855 | 920 | No cure | | No cure | | 1,875 | 890 | 1,475 | 1,020 | No cure | |
| 30 | 3,410 | 805 | 2,600 | 915 | No cure | | 3,055 | 785 | 3,530 | 780 | 3,525 | 830 |
| 60 | 4,090 | 760 | 4,600 | 730 | 3,410 | 830 | 4,000 | 760 | 4,575 | 695 | 4,650 | 705 |
| 120 | 4,155 | 750 | 4,035 | 620 | 4,150 | 665 | 4,480 | 720 | 3,775 | 590 | 3,640 | 525 |

It can be seen that the thioamines were excellent retarders for the vulcanization in the presence of dithiocarbamyl accelerators at the beginning of the vulcanization, but that vulcanizates having superior physical properties may be produced by using the proper proportions and selecting the proper curing time and temperature. When the first two compositions in the above table were cured for 120 min. at 220° F. and subjected to artificial aging tests, it was found that the vulcanizate containing the thioamine was from 2 to 5 times more resistant to deterioration than the vulcanizate which contained no retarder. This increased resistance to deterioration is characteristic of the vulcanizates produced by employing the method of this invention.

The fact that the thioamines retarded the vulcanization of rubber in the above examples is particularly surprising since they are not only accelerators, but they are also vulcanizing agents which produce well-cured rubber in the absence of any added free sulfur. A very useful embodiment of this invention comprises the use of suitable amounts of a polythioamine, up to 5%, for instance, and adding no free sulfur to the composition.

Although the invention has been described in detail in connection with specific rubber compositions, it will be evident that this invention is applicable to rubber compositions of the most varied nature, and that all manner of rubber goods including pneumatic and solid rubber tires, tubes, hose, electrical insulation, belting, packing, boots and shoes, surgical rubber goods, seamless dipped rubber articles, etc. may be vulcanized in the presence of the combinations herein described. The materials may be incorporated in the rubber by mastication, milling or any similar process, or in the case of latex, rubber cement, or any other natural or artificial dispersion or solution of rubber, by simply dissolving or suspending the accelerator therein.

The vulcanization may be performed in other manners than that particularly set forth in the specific examples; specifically, rubber compositions may be heated in hot air, steam, hot water, etc.

It is to be understood that the term "a rubber" is employed in the appended claims in a generic sense to designate those rubbery materials which are vulcanizable with sulfur, including caoutchouc, balata, gutta percha, latex, rubber isomers, or synthetic rubber whether or not admixed with pigments, fillers, softeners, antioxidants, other accelerators, etc., but not including materials incapable of vulcanization by reaction with sulfur.

While I have herein disclosed specific embodiments of my invention, I do not intend to limit myself solely thereto, for it will be obvious to those skilled in the art that many modifications such as using other materials having equivalent properties and varying the proportions of materials used are within the spirit and scope of the invention as defined in the appended claims.

I claim:

1. The method which comprises vulcanizing a rubber in the presence of an accelerator characterized by the

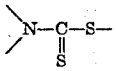

group and a thioamine having the structural formula R—S$_x$—R' wherein R and R' are members of the class consisting of secondary and tertiary amino groups and $x$ is one of the integers 1, 2, 3, and 4.

2. The method which comprises vulcanizing a rubber in the presence of an accelerator characterized by the

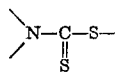

group and a N,N'-polythiodialkylamine.

3. The method which comprises vulcanizing a rubber in the presence of an accelerator characterized by the

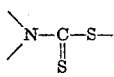

group and N,N'-dithiodiethylamine.

4. The method which comprises vulcanizing a rubber in the presence of a zinc salt of a dithiocarbamic acid and a thioamine having the structural formula R—S$_x$—R' wherein R and R' are members of the class consisting of secondary and tertiary amino groups and $x$ is one of the integers 1, 2, 3, and 4.

5. The method which comprises vulcanizing a rubber in the presence of the zinc salt of dimethyldithiocarbamic acid and N,N'-dithiodiethylamine.

6. The method which comprises vulcanizing a rubber in the presence of a tris (diarylthiocarbamylmercaptomethyl) amine and a thioamine having the structural formula R—S$_x$—R' wherein R and R' are members of the class consisting of secondary and tertiary amino groups and $x$ is one of the integers 1, 2, 3, and 4.

7. The method which comprises vulcanizing a rubber in the presence of a tris (diarylthiocarbamylmercaptomethyl) amine and a N,N'-polythiodialkylamine.

8. The method which comprises vulcanizing a rubber in the presence of tris (diphenylthiocarbamylmercaptomethyl) amine and N,N'-dithiodiethylamine.

9. A rubber composition comprising a rubber which has been vulcanized in the presence of an accelerator characterized by the

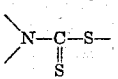

group and a thioamine having the structural formula R—S$_x$—R' wherein R and R' are members of the class consisting of secondary and tertiary amino groups and $x$ is one of the integers 1, 2, 3, and 4.

10. A rubber composition comprising a rubber which has been vulcanized in the presence of an accelerator characterized by the

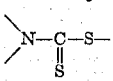

group and a N,N'-polythiodialkylamine.

11. A rubber composition comprising a rubber which has been vulcanized in the presence of an accelerator characterized by the

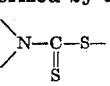

group and N,N'-dithiodiethylamine.

12. A rubber composition comprising a rubber which has been vulcanized in the presence of a zinc salt of a dithiocarbamic acid and a thioamine having the structural formula R—S$_x$—R' wherein R and R' are members of the class consisting of secondary and tertiary amino groups and $x$ is one of the integers 1, 2, 3, and 4.

13. A rubber composition comprising a rubber which has been vulcanized in the presence of the zinc salt of dimethyldithiocarbamic acid and N,N'-dithiodiethylamine.

14. A rubber composition comprising a rubber which has been vulcanized in the presence of a tris (diarylthiocarbamylmercaptomethyl) amine and a thioamine having the structural formula R—S$_x$—R' wherein R and R' are members of the class consisting of secondary and tertiary amino groups and $x$ is one of the integers 1, 2, 3, and 4.

15. A rubber composition comprising a rubber which has been vulcanized in the presence of a tris (diarylthiocarbamylmercaptomethyl) amine and a N,N'-polythiodialkylamine.

16. A rubber composition comprising a rubber which has been vulcanized in the presence of tris (diphenylthiocarbamylmercaptomethyl) amine and N,N'-dithiodiethylamine.

PAUL C. JONES.